United States Patent [19]

Murakami

[11] Patent Number: 5,567,508
[45] Date of Patent: Oct. 22, 1996

[54] ROLLING BEARING WITH SURFACE HARDENED LAYER

[75] Inventor: Yasuo Murakami, Kanagawa, Japan

[73] Assignee: NSK Ltd., Tokyo, Japan

[21] Appl. No.: 515,042

[22] Filed: Aug. 14, 1995

[30] Foreign Application Priority Data

Aug. 12, 1994 [JP] Japan .................. 6-190574

[51] Int. Cl.$^6$ .................................. F16C 33/62
[52] U.S. Cl. .......... 428/217; 428/698; 428/704; 384/490; 384/491; 384/492; 384/548; 384/625; 384/912
[58] Field of Search .................. 384/492, 490, 384/548, 625, 912, 491; 428/217, 698, 704

[56] References Cited

U.S. PATENT DOCUMENTS 3,682,519  8/1972  Shelpelyakovsky et al. .......... 308/212
4,659,241  4/1987  Bamberger et al. .................. 384/625
4,696,581  9/1987  Tsushima et al. .................... 384/492

FOREIGN PATENT DOCUMENTS

| 62-132031 | 6/1987 | Japan . |
| 1253788 | 11/1971 | United Kingdom . |
| 2183745 | 6/1987 | United Kingdom . |
| 2243417 | 10/1991 | United Kingdom . |
| 2250787 | 6/1992 | United Kingdom . |

*Primary Examiner*—Archene Turner
*Attorney, Agent, or Firm*—Sughrue, Mion, Zinn, Macpeak & Seas

[57] ABSTRACT

One of components of a rolling bearing which includes an inner race, an outer race and a plurality of rolling elements is carburized or a carbonitrided to form a surface hardened layer, and the depth of the hardened layer is 0.025 to 0.045 times the average diameter of the rolling elements at a point Zo and the depth ratio (Zo/Yo) of the point Zo to a point Yo is less than or equal to 0.8. The rolling bearing having the surface hardened layer is capable of improving both the rolling life and the impact strength.

1 Claim, 5 Drawing Sheets

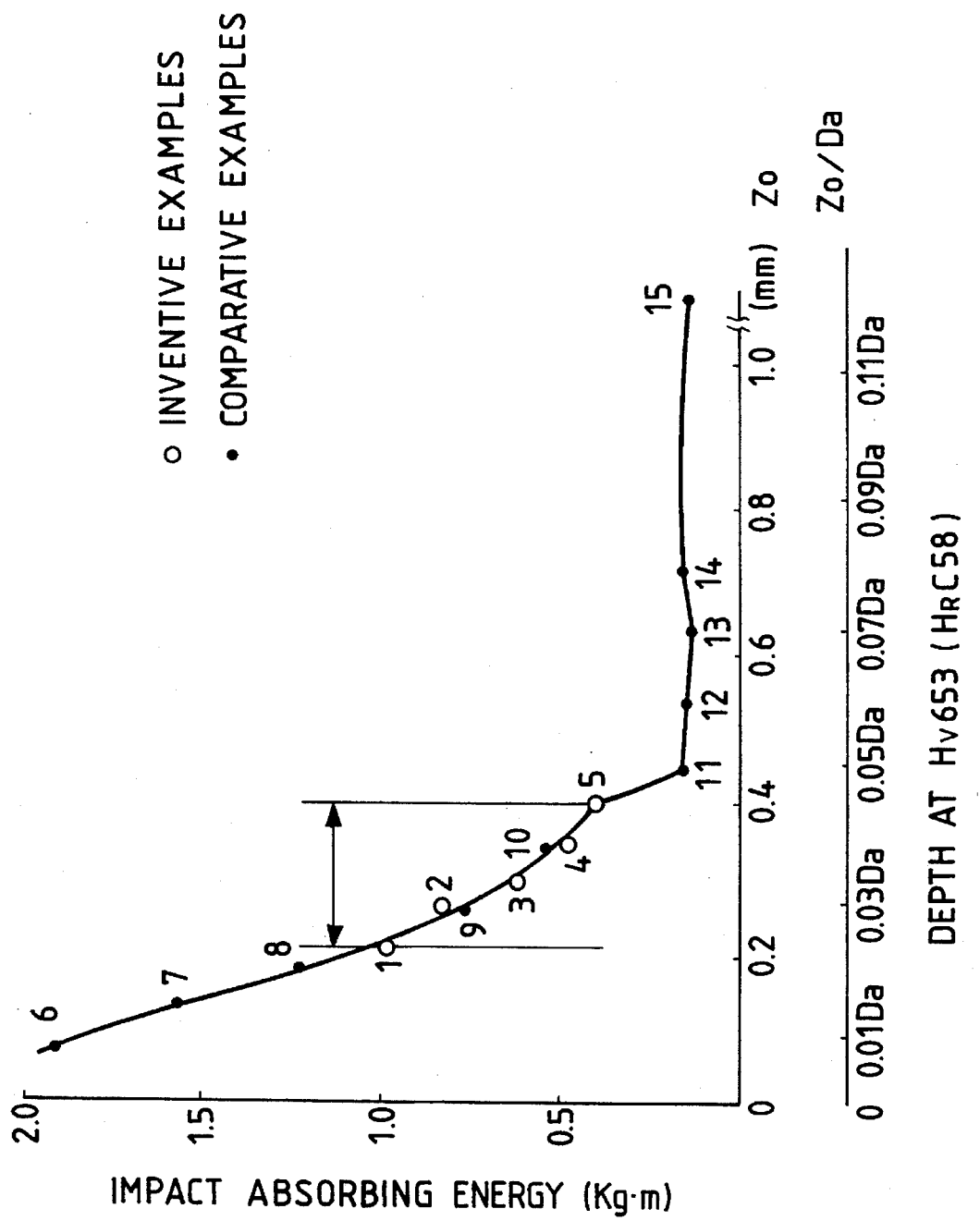

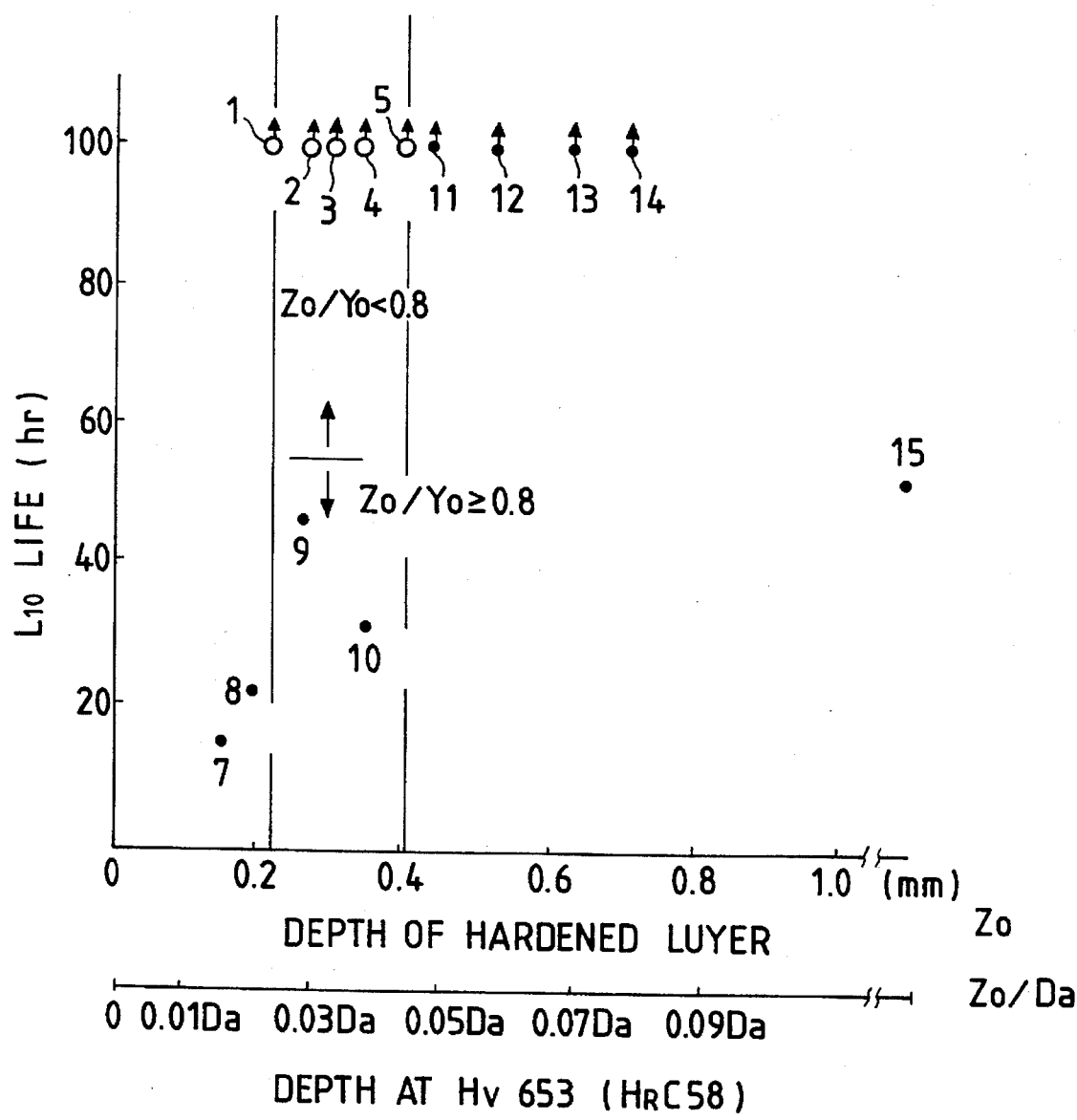

ROLLING BEARING WITH SURFACE HARDENED LAYER

BACKGROUND OF THE INVENTION

The present invention relates to rolling bearings for use in vehicles, agricultural machines, construction machines, steel making machines, and the like. More particularly, the present invention relates to rolling bearings having a surface hardened layer with high impact resistance and long service life so that it is suitable for use in transmissions and engines.

Rolling bearings are used under severe conditions in which they are subjected to repeated shearing stress under high contact pressure. In order to withstand the applied shearing stress to thereby secure the necessary rolling fatigue life (hereinafter also referred to simply as "rolling life" or "life"), a high-carbon chromium bearing steel (SUJ 2) has generally been used as a bearing material. The steel is hardened and tempered to provide the Rockwell hardness of $H_RC$ 58 to 64.

Case hardening steels have also been used to extend the life of bearings. In order to set a hardness curve in accordance with the distribution of internal shearing stresses due to a contact pressure, low carbon case hardening steels such as SCR 420H, SCM 420H, SAE 8620H, SAE 4320H and the like, which have the superior hardenability, are carburized or carbonitrided, followed by hardening and tempering to produce inner and outer races and rolling elements that have the surface hardness of $H_RC$ 58 to 64 and the core hardness of $H_RC$ 30 to 48. Thus, the required service life has been secured by the above heat treatments.

However, no definite criteria have been set for determining the depth of a hardened layer that is appropriate for rolling bearings. For example, Unexamined Japanese Patent Publication No. Sho. 62-132031 has referred to the advances of the steel making technology in relation to the depth of the surface hardened layer in raceway rings and rolling elements of a rolling bearing. That is, it shows that the relationship between the depth of carburization in case hardening steels and service life which has drastically changed in the past ten years. Stated more specifically, the results of experiments conducted on case hardening steels in the 1970s showed that there was an optimal value for the depth of carburization and that the rolling life decreased irrespective of whether carburization was too shallow or deep. On the other hand, the results of experiments conducted on case hardening steels in the 1980s revealed that the rolling life elongated as the depth of carburization was increased. The results have been assumed to suggest the influence of non-metallic inclusions which serve as a source of stress concentration. On the basis of this assumption, Unexamined Japanese Patent Publication No. Sho. 62-132021 has proposed that the life of a rolling bearing extends by increasing the depth of the surface hardened layers in the raceway rings and the rolling elements to such a value as the depth relative to the diameter of each rolling element (depth/diameter) is 0.05 or more in the raceway rings and 0.07 or more in the rolling elements.

However, a surface hardened layer that is too thick not only increases the cost of heat treatments because an elongated time is required for carburization or carbonitriding but also deteriorates the superior impact strength property which is inherent from the surface hardening treatment.

SUMMARY OF THE INVENTION

The present invention has an object of providing a rolling bearing having a surface hardened layer that is capable of improving both the rolling life and the impact strength.

This object of the present invention can be attained by a rolling bearing with components including an inner race, an outer race and a plurality of rolling elements, one of the components being carburized or carbonitrided to form a hardened layer on a surface thereof, in which a depth of the hardened layer is 0.025 to 0.045 times an average diameter of the rolling elements at a point Zo and a depth ratio (Zo/Yo) of the point Zo to a point Yo is less than or equal to 0.8.

BRIEF DESCRIPTION OF THE DRAWINGS

In the accompanying drawings:

FIG. 6 is a graph showing the relationship between impact absorbing energy and the depth of a hardened layer; and FIG. 7 is a graph showing the relationship between $L_{10}$ life and the depth of a hardened layer.

DETAILED DESCRIPTION OF THE PREFERRED EMBODIMENTS

Description will be given below in detail of an embodiment of a rolling bearing according to the present invention with reference to the accompanying drawings.

First, there are described practical and theoretical circumstances relating to the life of rolling bearings.

It is known experientially that flaking which is a factor of decreasing the life of rolling bearings often results from cracking due to rolling fatigue which occurs inside the bearing material near the rolling surface. Accordingly, it is assumed that the stress causing the flaking exists not on the surface of contact but below the surface.

Figure 1:
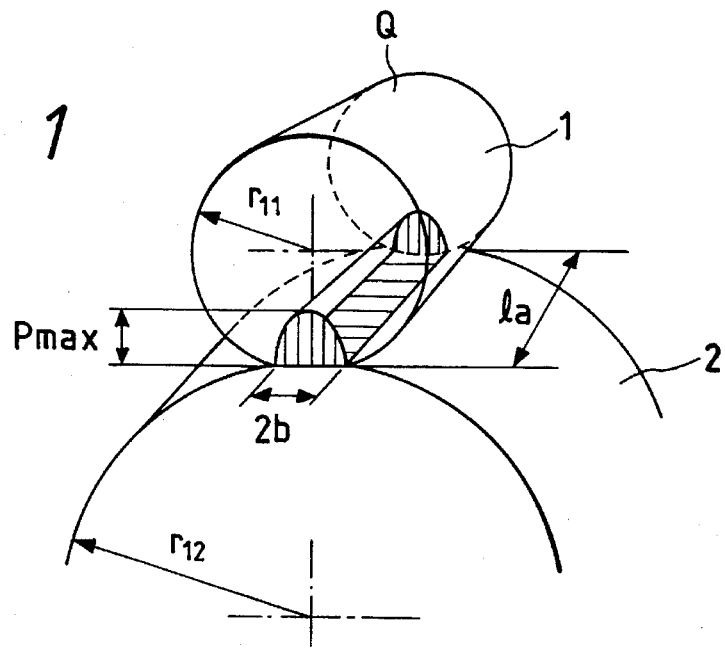
FIG. 1 is a diagram illustrating the contact pressure of contact acting between two cylinders, and the width of their contact.

Suppose that two solid members such as a raceway ring and a rolling element in a cylindrical rolling bearing contact each other to receive a load. Then, the contacting portions deform elastically to form a contact region, so that a contact pressure is produced within the contact region. If the contact region is sufficiently smaller than the solid members, Hertz contact occurs. As shown in FIG. 1, in a case where a cylinder 1 having a radius of $r_{11}$ and a cylinder 2 having a radius of $r_{12}$ contact each other with their axes extending parallel to each other. Then, a maximum contact pressure $p_{max}$ and the width of contact $2b$ are given by the Hertz theory of contact stress as follows:

$$p_{max} = [\{E/\pi(1-1/m^2)\} \cdot \Sigma\rho/2 \cdot Q/l_a]^{1/2} \quad (1)$$

$$2b = [\{32(1-1/m^2)/\pi E \Sigma\rho\} \cdot Q/l_a]^{1/2} \quad (2)$$

where

Figure 2:
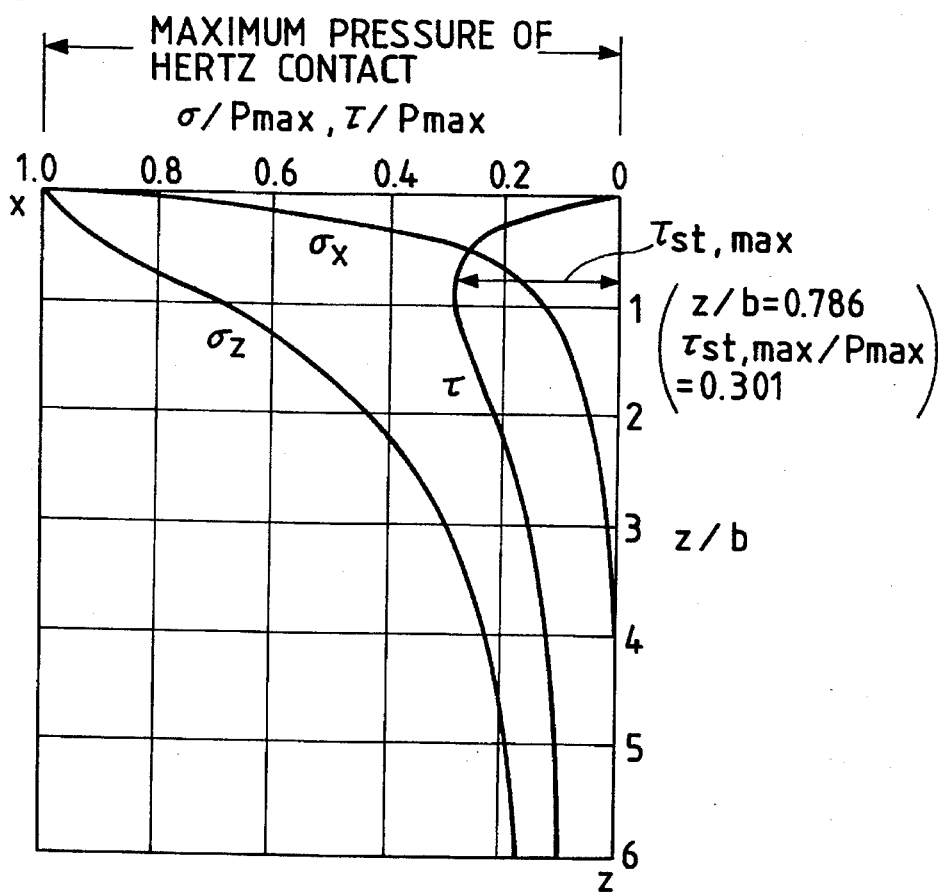
FIG. 2 is a graph showing the distribution of contact stresses.

E: modulus of longitudinal elasticity m: Poisson's number $\Sigma\rho$: the sum of the curvatures (mm$^{-1}$) of the two cylinders, $\Sigma\rho = \rho_{11} + \rho_{12}$ $\rho_{11}$: the curvature (mm$^{-1}$) of cylinder 1, $\rho_{11}=1/r_{11}$ $\rho_{12}$: the curvature (mm$^{-1}$) of cylinder 2, $\rho_{12}=2/r_{12}$ Q: the load (kgf) applied normal to the two cylinders $l_a$: the length (mm) of contact between the two cylinders FIG. 2 is a graph showing how the stress distribution changes in the directions of depth Z below the contact surface in the above case. The shearing stress $\tau_{st}$ in vicinity of the contact point is given by $(\sigma_x-\sigma_z)/2$, where $\sigma_x$ and $\sigma_z$ are the main stresses in the directions of x and z axes, respectively. Obviously from FIG. 2, $\tau_{st}$ assumes a maximum value at a certain depth of $(Zst)_{max}$ directly below the center of the contact point. The maximum shearing stress $(\tau_{st})_{max}$ is 0.301 $p_{max}$ and the value of $(Zst)_{max}$ which is the depth at $(\tau_{st})_{max}$ is 0.786 b.

Dividing eq. (2) by eq. (1) gives:

$$2b/p_{max}=8(1-1/m^2)/E\cdot\Sigma\rho \quad (3)$$

If the cylinder 1 shown in FIG. 1 is assumed as a roller (radius, $r_{11}$; diameter $Da=2r_{11}$) and the cylinder 2 as an inner race (radius, $r_{12}$), then it can be approximated as $\Sigma\rho=\rho_{11}+\rho_{12}\approx 1/r_{11}=2/Da$ because of $r_{11}<r_{12}$.

When a load Q is applied to the roller (cylinder 1) and the inner race (cylinder 2) in a rolling bearing while they are in a stationary state (not rotating), local permanent deformation occurs in both members. If the deformation is unduly great, it hinders the rotation of the roller. In order to sustain the deformation within a certain limit, a basic static load rating is specified as a measure for a maximum load $Q_{max}$ which can be accepted by the rolling bearing in the stationary state (JIS B 1519). According to the specification, the sum of the permanent deformations of the rolling element (cylinder 1) and the inner race (cylinder 2) that are permissible in the contact portion of the rolling bearing which is subject to the maximum stress is 0.0001 times as large as the diameter Da of the rolling element. Therefore, the maximum contact pressure $p_{max}$ is about 400 kgf/mm$^2$. In practice, such a high contact pressure cannot be applied. At most, $p_{max}$ is 300 kgf/mm$^2$.

Substituting the relationships of $p_{max}=400$ kgf/mm$^2$ and $\Sigma\rho=2/Da$ into eq. (3), and giving values of $E=21,200$ kgf/mm$^2$ and $m=10/3$ for a steel, the following equation is obtained:

$$2b=0.0687\ Da \quad (4)$$

Since the depth $(Zst)_{max}$ at the maximum shearing stress $(\tau_{st})_{max}$ is 0.786 b according to FIG. 2, one may substitute this value into eq. (4) to represent:

$$(Zst)_{max}=0.027\ Da \quad (5)$$

Substituting $p_{max}=400$ kgf/mm$^2$ into the above-described equation for relating the maximum shearing stress $(\tau_{st})$max at the depth $(Zst)_{max}$ to the maximum contact pressure $p_{max}$, the following value is obtained:

$$(\tau_{st})_{max}=0.301\times p_{max}=120\ kgf/mm^2 \quad (6)$$

Since this value $(\tau_{st})$max is based on an unrealistically high contact pressure, it can safely be concluded that if a hardness curve exceeding the value is set for parts of a rolling bearing, no plastic yield occurs below the surface of the contact portion, and the hardened layer does not produce indentations or cracks causing the early flaking. The Vickers hardness (Hv) of a steel material is about three times as large as the yield stress. Theoretically, the shearing stress $\tau_{st}$ may be regarded as one half of the yield stress. Accordingly, $\tau_{st}$ is about ⅙ of Hv, indicating that the early flaking can be prevented by setting the Vickers hardness Hv to values at least six times as large as $\tau_{st}$.

Thus, in order to satisfy the basic static load rating, a hardness at least six times as large as $(\tau_{st})$max=120 kgf/mm$^2$ (see eq. (6)), namely, a Vickers hardness of at least Hv 720 (equivalent to a Rockwell hardness of at least $H_RC$ 61), is required for a layer to a depth of at least 0.027 Da below surface.

Similarly, determining a ratio z/b from the $\tau$ curve shown in FIG. 2 under Hv=6×$\tau_{st}$ and $p_{max}$=400 kgf/mm$^2$, and calculating the relationship between the depth below surface and the required hardness Hv, it can reach the conclusion that the static load rating cannot be satisfied unless the depth Zo at Hv 653 ($H_RC$ 58) is about 0.05 Da and the depth Yo at Hv 550 ($H_RC$ 52.4) is about 0.07 Da.

Based on these findings, the present inventors conducted further studies on the relationship between the depth of the hardened layer and the impact strength. The inventors prepared samples which had various levels of the depth of the hardened layer and its hardness to evaluate the impact strength and the life of each sample. Based on the test results, the inventors specified a hardness curve that is optimal for practical rolling bearings to thereby to accomplish the present invention.

The present invention specifies the depth of the hardened layer to be 0.025 to 0.045 times the average diameter of rolling elements at the point Zo. The reason is because if the lower limit 0.025 is not reached, the hardened layer is too shallow to secure the required life under heavy loads, on the other hand, if the upper limit 0.045 is exceeded, the impact absorbing energy reduces to the level of bearing steels.

The present invention specifies the value of Zo/Yo to be less than 0.8. This is because experiments have substantiated that if Zo/Yo is 0.8 or more, the slope of the hardness curve showing the change in the hardness of the hardened layer in the direction of its depth becomes so steep that the life of the rolling bearing is shorter than the calculated value.

EXAMPLE

Examples of the present invention is further described with reference to accompanying drawings.

The samples used in the examples were conical roller bearings identified with a designation of 30306D (average roller diameter of 9 mm).

The steel species SCr 420 and SCr 440 (case hardening steels) were used not only for inventive examples according the present invention but SUJ 2 (bearing steel) was also used for comparative examples. Parts made of case hardening steels were subjected to carburizing (or carbonitriding).

Each sample was adjusted to have a Rockwell surface hardness $H_RC$ 62. The depth (mm) of the point Zo where the Vickers hardness was Hv 653 (equivalent to $H_RC$ 58) and the depth (mm) of the point Yo where the hardness was Hv 550 ($H_RC$ 52.4) were measured to determine their respective ratios Zo/Da and Yo/Da to the average diameter (Da in mm) of rolling elements. In addition, the ratio of Zo to Yo (Zo/Yo) was also determined.

Further, impact tests were conducted on each sample to investigate the relationship between the depth of the hardened layer and its impact strength. The impact absorption energy was determined for each sample to evaluate its impact strength. Life tests were also conducted on each sample to determine its $L_{10}$ life, so that its durability was evaluated.

The impact tests were carried out by the following procedure.

Figure 3:
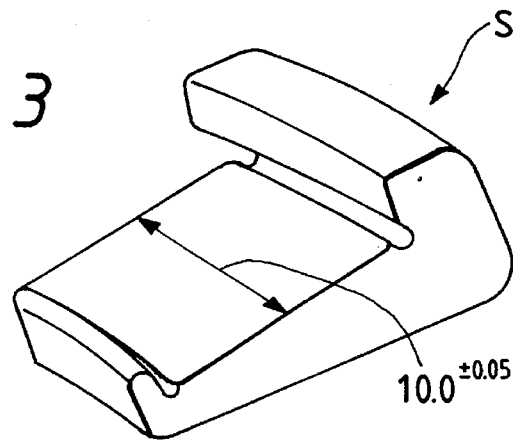
FIG. 3 is a perspective view of a test specimen for use in impact tests.
Figure 4:
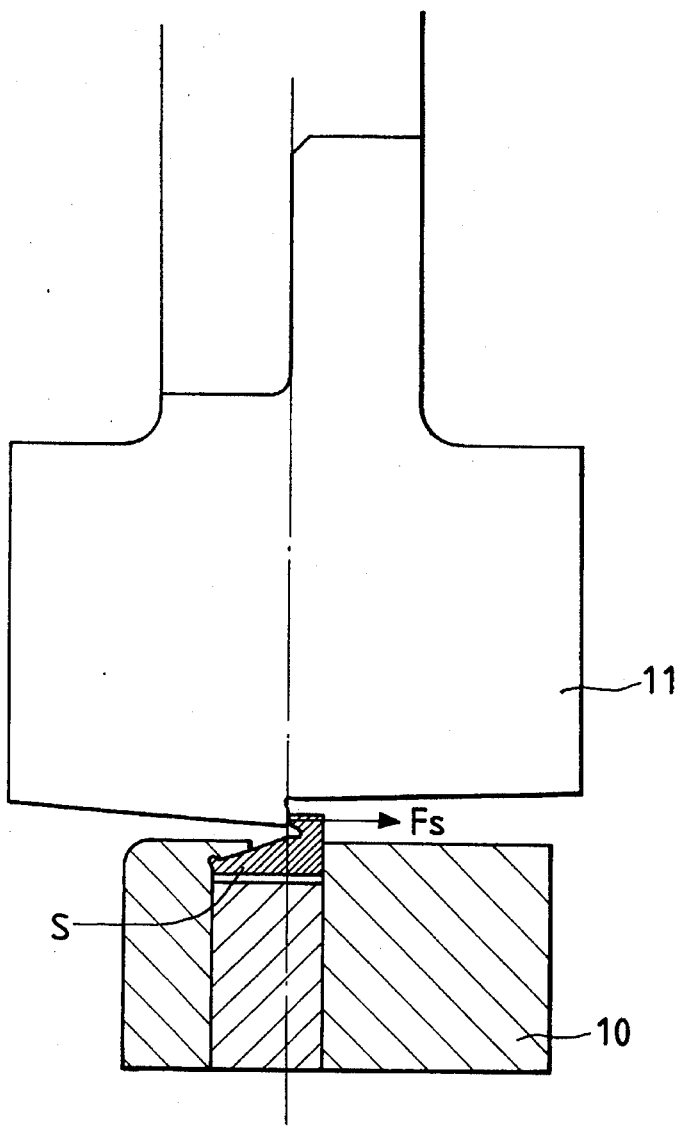
FIG. 4 is a sketch showing diagrammatically the method of the impact tests.

After measuring Zo and Yo values, the inner race of each sample of the conical roller bearing identified with a designation of 30306D for inventive and comparative examples was cut out to a width of 10.0±0.05 mm to prepare a test specimen S as shown in FIG. 3. The test specimen S was mounted on the support 10 of a Charpy impact tester as shown in FIG. 4. An impact load Fs was applied to the test specimen S by a tool 11. Eight test specimens were prepared for each sample and subjected to the impact tests. The results were averaged for n=8.

The life tests were conducted by the following procedure.

Figure 5:
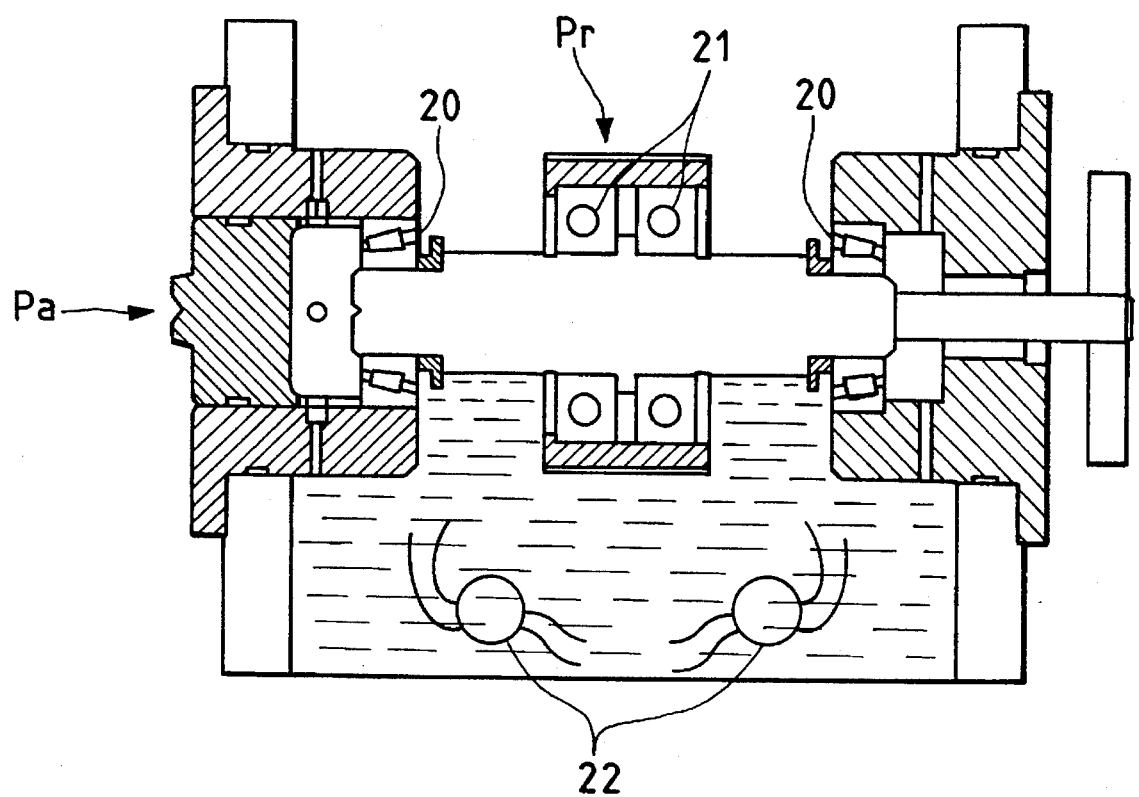
FIG. 5 is a diagrammatic representation of a medium-size box life tester.

A medium-size box tester (as specified on page 14 of SAE Paper 940728) was employed to perform the life tests under clean lubricating conditions. As shown in FIG. 5, the medium-size box tester mounted samples 20 of bearings under an axial load Pa, and a radial load Pr applied through a support bearing 21. Further, a lubricant was agitated by air agitators 22. The calculated life was 28 hours. The other test conditions were:

Radial load Fr=2,000 kgf;

Thrust load Fa=700 kgf; and

Rotational speed N=4,000 rpm.

Five specimens were prepared for each sample (n=5) and the test was discontinued upon the lapse of 100 hours which was 3.6 times as long as the calculated life. The condition of the life tests was far severe more than the practical level, and yet the maximum contact pressure $p_{max}$ of contact between the inner race and the rollers was about 300 kgf/mm², which was lower than the above-mentioned 400 kgf/mm².

The results of measurements of the respective parameters and those of the tests conducted are collectively shown in Table 1.

The relationship between impact absorbing energy and the depth of the hardened layer is graphically shown in FIG. 6. The vertical axis of the graph plots the impact absorbing energy (kg·m) and the horizontal axis plots both the depth (mm) to the point Zo where the Vickers hardness was Hv 653 (equivalent to $H_RC$ of 58) and the ratio Zo/Da of Zo to the average diameter Da (mm) of the rollers as rolling elements.

As is evident from FIG. 6, the impact absorbing energy decreased as the increasing depth of the point Zo and at Zo=0.05 Da and, in fact, it decreased to levels which were almost comparable to that of the bearing steel SUJ 2.

The relationship between $L_{10}$ life and the depth of the hardened layer is graphically shown in FIG. 7. The vertical axis of the graph plots the life (hour) and the horizontal axis plots both the depth (mm) to the point Zo where the Vickers hardness was Hv 653 (equivalent to $H_RC$ 58) and the ratio Zo/Da of Zo to the average diameter Da (mm) of the rollers.

As is evident from FIG. 7, Sample Nos. 6, 7 and 8 in which Zo<0.025 Da had the hardened layer formed in such a shallow depth that their life was undesirably short under the applied load. On the other hand, the bearing samples that had the hardened layer formed in depths which fulfilled the relation Zo≧0.025 Da were characterized by a long life in excess of 100 hours, with the only exception of Sample Nos. 9 and 10.

In Sample Nos. 9 and 10, the value of Zo/Yo was 0.8 or more and their hardness curves were so steep as to shorten their life.

As described above, the rolling bearing of the present invention has any one of the components (i.e., an inner race, an outer race and a plurality of rolling elements) carburized or carbonitrided to form a surface hardened layer, characterized in the depth of the hardened layer is 0.025 to 0.045 times the average diameter of the rolling elements at point Zo and that the depth ratio of the point Zo to the point Yo (Zo/Yo) is less than or equal to 0.8. This is effective in securing against not only the shortening of the bearing's life under heavy loads due to the formation of a hardened layer that is too shallow but also the drop of impact absorbing energy to the level of bearing steels due to the formation of a hardened layer that is too deep. Additionally, the slope of the hardness curve representing the hardness of the hardened layer fin the direction of its depth is not so steep that there is no possibility that the life of the rolling bearing becomes shorter than the calculated value. Hence, the rolling bearing of the present invention is improved in both the rolling life and the impact strength.

What is claimed is:

1. In a rolling bearing with components comprising an inner race, an outer race and a plurality of rolling elements,

TABLE 1

| Sample No. | Steel species | Surface hardness, $H_RC$ | Zo/Da | Yo/Da | Zo/Yo | Impact absorbing energy, kg·m | Life, h | | | | |
|---|---|---|---|---|---|---|---|---|---|---|---|
| 1 | SCr 420 | 62.0 | 0.025 | 0.041 | 0.61 | 0.98 | ≧100 | ≧100 | ≧100 | ≧100 | ≧100 |
| 2 | " | 62.1 | 0.031 | 0.040 | 0.78 | 0.83 | ≧100 | ≧100 | ≧100 | ≧100 | ≧100 |
| 3 | " | 62.3 | 0.034 | 0.047 | 0.72 | 0.62 | ≧100 | ≧100 | ≧100 | ≧100 | ≧100 |
| 4 | SCr 440 | 62.3 | 0.039 | ∞ | 0 | 0.47 | ≧100 | ≧100 | ≧100 | ≧100 | ≧100 |
| 5 | " | 61.9 | 0.045 | ∞ | 0 | 0.40 | ≧100 | ≧100 | ≧100 | ≧100 | ≧100 |
| 6 | SCr 420 | 62.0 | 0.010 | 0.022 | 0.45 | 1.91 | N.A. due to excessive vibrations | | | | |
| 7 | " | 62.1 | 0.017 | 0.029 | 0.59 | 1.57 | 21 | 27 | 17 | 33 | 27 |
| 8 | " | 61.8 | 0.022 | 0.031 | 0.71 | 1.22 | 45 | 33 | 51 | 30 | 27 |
| 9 | " | 62.2 | 0.030 | 0.037 | 0.81 | 0.76 | ≧100 | 78 | ≧100 | 98 | 51 |
| 10 | " | 62.1 | 0.039 | 0.046 | 0.85 | 0.54 | 36 | 77 | 53 | ≧100 | 9 |
| 11 | SCr 440 | 62.0 | 0.050 | ∞ | 0 | 0.16 | ≧100 | ≧100 | ≧100 | ≧100 | ≧100 |
| 12 | " | 62.0 | 0.060 | ∞ | 0 | 0.15 | ≧100 | ≧100 | ≧100 | ≧100 | ≧100 |
| 13 | " | 61.9 | 0.071 | ∞ | 0 | 0.14 | ≧100 | ≧100 | ≧100 | ≧100 | ≧100 |
| 14 | " | 61.8 | 0.080 | ∞ | 0 | 0.16 | ≧100 | ≧100 | ≧100 | ≧100 | ≧100 |
| 15 | SUJ 2 | 62.1 | ∞ | ∞ | 1 | 0.15 | 58 | ≧100 | ≧100 | ≧100 | 96 | one of the components being carburized or carbonitrided to form a hardened layer on a surface thereof, the improvement wherein the hardened layer has a depth to a point Zo which is 0.025 to 0.045 times an average diameter of the rolling elements and a depth ratio (Zo/Yo) of the point Zo to a point Yo is equal to or less than 0.8, the point Zo being a depth where hardness is $H_RC$ 58, the point Yo being a depth where hardness is $H_RC$ 52.4.

* * * * *